(12) United States Patent
Giehrl et al.

(10) Patent No.: US 8,028,820 B2
(45) Date of Patent: Oct. 4, 2011

(54) DEVICE FOR STORING OBJECTS

(75) Inventors: Robert Giehrl, Wiesent (DE); Juergen Koller, Walderbach (DE)

(73) Assignee: Krones AG, Neutraubling (DE)

( * ) Notice: Subject to any disclaimer, the term of this patent is extended or adjusted under 35 U.S.C. 154(b) by 336 days.

(21) Appl. No.: 11/997,262

(22) PCT Filed: Jan. 16, 2007

(86) PCT No.: PCT/EP2007/000305
§ 371 (c)(1),
(2), (4) Date: Jul. 8, 2008

(87) PCT Pub. No.: WO2007/096028
PCT Pub. Date: Aug. 30, 2007

(65) Prior Publication Data
US 2009/0200136 A1    Aug. 13, 2009

(30) Foreign Application Priority Data
Feb. 20, 2006    (DE) .................... 10 2006 008 123

(51) Int. Cl.
*B65G 47/51* (2006.01)
(52) U.S. Cl. .................... 198/594; 198/347.3; 198/575; 198/778
(58) Field of Classification Search ............... 198/347.3, 198/444, 575, 594, 778
See application file for complete search history.

(56) References Cited

U.S. PATENT DOCUMENTS

| | | |
|---|---|---|
| 1,810,419 A | 6/1931 | Francis |
| 2,788,140 A | 4/1957 | Becker |
| 3,297,138 A | 1/1967 | McCombie |
| 3,575,282 A | 4/1971 | Gaiotto et al. |
| 3,664,487 A | 5/1972 | Ballenger |
| 3,968,861 A | 7/1976 | Kernen et al. |
| 4,018,325 A | 4/1977 | Rejsa |
| 4,153,858 A | 5/1979 | Schylander et al. |
| 4,269,299 A | 5/1981 | Goodman |
| 4,294,345 A | 10/1981 | Stauber et al. |
| 4,399,909 A | 8/1983 | Gorelik |
| 4,413,724 A | 11/1983 | Fellner |
| 4,468,277 A | 8/1984 | Kontz |
| 4,469,219 A | 9/1984 | Cosse et al. |
| 4,513,858 A | 4/1985 | Fellner et al. |
| 4,549,647 A | 10/1985 | Cosse |

(Continued)

FOREIGN PATENT DOCUMENTS

CA    2364216    6/2003

(Continued)

OTHER PUBLICATIONS

Final Office Action for U.S. Appl. No. 10/588,046 (Jun. 8, 2009).

(Continued)

*Primary Examiner* — Douglas Hess
(74) *Attorney, Agent, or Firm* — Marshall, Gerstein & Borun LLP

(57) ABSTRACT

A device for storing articles with two conveyor tracks that can be driven in opposite directions and a transfer mechanism that can be moved along the conveyor tracks for transferring the articles between the two conveyor tracks // with this device at least one functional control unit that monitors the device is provided. This significantly improves the possibility of detecting damage and trouble and prevents serious consequences, damages and downtime.

10 Claims, 5 Drawing Sheets

U.S. PATENT DOCUMENTS

| | | | |
|---|---|---|---|
| 4,565,284 A | 1/1986 | Seragnoli et al. | |
| 4,838,410 A | 6/1989 | Gough | |
| 4,903,823 A | 2/1990 | Plesser et al. | |
| 4,989,718 A | 2/1991 | Steeber | |
| 5,022,609 A | 6/1991 | Cranston | |
| 5,076,422 A | 12/1991 | Clopton | |
| 5,129,506 A | 7/1992 | Gutov et al. | |
| 5,191,959 A | 3/1993 | Leemkuil | |
| 5,413,213 A | 5/1995 | Golz et al. | |
| 5,429,227 A | 7/1995 | Krossmann et al. | |
| 5,490,589 A | 2/1996 | Golz et al. | |
| 5,620,084 A | 4/1997 | Mensch | |
| 5,645,159 A | 7/1997 | Luginbuhl et al. | |
| 5,722,655 A | 3/1998 | Reist | |
| 5,772,005 A | 6/1998 | Hansch et al. | |
| 5,863,571 A | 1/1999 | Santais et al. | |
| 5,929,760 A * | 7/1999 | Monahan | 340/572.7 |
| 5,996,322 A | 12/1999 | La Barre | |
| 6,079,541 A | 6/2000 | Bercelli et al. | |
| 6,114,961 A * | 9/2000 | Denholm et al. | 340/572.3 |
| 6,119,848 A | 9/2000 | Hartness, III et al. | |
| 6,152,291 A | 11/2000 | Steeber et al. | |
| 6,168,004 B1 | 1/2001 | Drewitz et al. | |
| 6,182,812 B1 | 2/2001 | Hartness, III et al. | |
| 6,209,716 B1 | 4/2001 | Bogle et al. | |
| 6,230,874 B1 | 5/2001 | Steeber et al. | |
| 6,241,074 B1 | 6/2001 | Steeber | |
| 6,260,688 B1 | 7/2001 | Steeber et al. | |
| 6,334,528 B1 | 1/2002 | Bogle et al. | |
| 6,354,427 B1 | 3/2002 | Pickel et al. | |
| 6,382,398 B2 | 5/2002 | Steeber et al. | |
| 6,394,260 B1 | 5/2002 | Barth et al. | |
| 6,446,781 B1 | 9/2002 | De Villele | |
| 6,497,321 B2 | 12/2002 | Horton et al. | |
| 6,520,318 B1 | 2/2003 | Humele | |
| 6,523,669 B1 | 2/2003 | Steeber et al. | |
| 6,533,103 B2 | 3/2003 | Hartness et al. | |
| 6,550,602 B2 | 4/2003 | Steeber et al. | |
| 6,585,104 B2 | 7/2003 | Horton et al. | |
| 6,591,963 B2 | 7/2003 | Wipf | |
| 6,601,697 B2 | 8/2003 | Steeber et al. | |
| 6,612,420 B1 | 9/2003 | Hartness, III et al. | |
| 6,662,936 B2 | 12/2003 | Ikemoto et al. | |
| 6,698,581 B2 | 3/2004 | Steeber et al. | |
| 6,725,997 B2 | 4/2004 | Draghetti | |
| 6,725,998 B2 | 4/2004 | Steeber et al. | |
| 6,761,264 B2 | 7/2004 | Steeber et al. | |
| 6,779,651 B1 | 8/2004 | Linglet et al. | |
| 6,817,464 B2 | 11/2004 | Biondi et al. | |
| 6,846,145 B2 | 1/2005 | Remericq | |
| 6,848,563 B2 | 2/2005 | Abert et al. | |
| 6,896,120 B2 | 5/2005 | Barry et al. | |
| 6,959,953 B2 | 11/2005 | Graffin | |
| 6,973,767 B2 | 12/2005 | Wagner et al. | |
| 7,021,452 B2 | 4/2006 | Horton et al. | |
| 7,032,742 B2 | 4/2006 | Hartness et al. | |
| 7,140,870 B2 | 11/2006 | Nava | |
| 7,191,896 B2 | 3/2007 | Hartness et al. | |
| 7,219,788 B2 | 5/2007 | Tuck et al. | |
| 7,264,113 B2 | 9/2007 | Hartness et al. | |
| 7,278,531 B2 | 10/2007 | Hartness et al. | |
| 7,299,832 B2 | 11/2007 | Hartness et al. | |
| 7,311,515 B2 | 12/2007 | Netsu | |
| 7,331,156 B2 | 2/2008 | Hartness et al. | |
| 7,334,677 B2 | 2/2008 | Mader et al. | |
| 7,413,072 B2 | 8/2008 | Horton et al. | |
| 7,431,142 B2 | 10/2008 | Eberle | |
| 7,442,031 B2 | 10/2008 | Netsu | |
| 7,492,259 B2 * | 2/2009 | Cox | 340/572.1 |
| 7,518,513 B2 * | 4/2009 | Liu | 340/572.1 |
| 2002/0053499 A1 | 5/2002 | Zurcher | |
| 2002/0144880 A1 | 10/2002 | Ikemoto et al. | |
| 2002/0195317 A1 | 12/2002 | Wipf | |
| 2003/0085103 A1 | 5/2003 | Horton et al. | |
| 2003/0155212 A1 | 8/2003 | Abert et al. | |
| 2007/0235288 A1 | 10/2007 | Horton et al. | |
| 2008/0142336 A1 | 6/2008 | Kronseder et al. | |
| 2008/0210520 A1 | 9/2008 | Legallais | |
| 2008/0223691 A1 | 9/2008 | Nishi et al. | |

FOREIGN PATENT DOCUMENTS

| | | |
|---|---|---|
| DE | 1080580 | 4/1960 |
| DE | 2610833 | 9/1977 |
| DE | 2618905 | 11/1977 |
| DE | 19824846 | 12/1999 |
| DE | 19928325 | 12/2000 |
| DE | 29913237 | 12/2000 |
| DE | 102004053663 | 8/2005 |
| DE | 202006003690 | 6/2006 |
| DE | 1020060120148 | 9/2007 |
| EP | 0506551 | 9/1992 |
| EP | 0581143 | 2/1994 |
| EP | 0734978 | 10/1996 |
| EP | 1161391 | 12/2001 |
| EP | 1275603 | 1/2003 |
| EP | 1295820 | 3/2003 |
| EP | 1389595 | 2/2004 |
| EP | 1832353 | 9/2007 |
| FR | 2745804 | 9/1997 |
| FR | 2766803 | 2/1999 |
| GB | 1301843 | 1/1973 |
| GB | 2047667 | 12/1980 |
| GB | 2143788 | 2/1985 |
| GB | 2300613 | 11/1996 |
| JP | 61-197376 | 9/1986 |
| JP | 70-46977 | 2/1995 |
| RU | 2160694 | 12/2000 |
| RU | 2198835 | 2/2003 |
| WO | WO-9709257 | 3/1997 |
| WO | WO-0043294 | 7/2000 |
| WO | WO-01/10754 | 2/2001 |
| WO | WO-01/98187 | 12/2001 |
| WO | WO-02/072454 | 9/2002 |
| WO | WO-2005073113 | 8/2005 |
| WO | WO-2007/025598 | 3/2007 |

OTHER PUBLICATIONS

International Preliminary Report on Patentability for International Application No. PCT/EP07/00305 (Oct. 14, 2008).

International Preliminary Report on Patentability for International Application No. PCT/EP2005/000942 (Oct. 3, 2006).

International Preliminary Report on Patentability for International Application No. PCT/EP2005/010747 (Apr. 24, 2007).

International Preliminary Report on Patentability for International Application No. PCT/EP2006/0006648 (Apr. 15, 2008).

International Preliminary Report on Patentability for International Application No. PCT/EP2007/000485 (Nov. 4, 2008).

International Preliminary Report on Patentability for International Application No. PCT/EP2007/005824 (Feb. 17, 2009).

International Search Report and Written Opinion for International Application No. PCT/EP2005/000942 (Sep. 30, 2005).

International Search Report and Written Opinion for International Application No. PCT/EP2005/010747 (Nov. 21, 2005).

International Search Report and Written Opinion for International Application No. PCT/EP2006/0006648 (Sep. 25, 2006).

International Search Report and Written Opinion for International Application No. PCT/EP2007/000485 (May 7, 2007).

International Search Report and Written Opinion for International Application No. PCT/EP2007/005824 (Oct. 8, 2007).

Non-final Office Action for U.S. Appl. No. 10/588,046 (Nov. 21, 2008).

Non-final Office Action for U.S. Appl. No. 11/663,097 (Apr. 13, 2009).

Written Opinion for PCT/EP2007/000305 dated Oct. 14, 2008.

Dynac Model 6400 Series General Specification Brochure, 2002, Hartness International, Greenville, SC, US (2 pp.).

Dynac 6000 Series Brochure, Hartness International, Greenville, SC, US (2 pp.).

Dynac Model 7000 Borchure, Harness International, Greenville, SC, US (2 pp.).
Dynac 7000 Series General Specification Brochure 2002, Hartness International, Greenville, SC, US (2 pp.).
Anonymous, "Paternoster", 7 pp., Retrieved from the Internet on Apr. 28, 2008: http://en.wikipedia.org/wiki/Paternoster.

Anonymous, "Paternoster lift, also known as the cyclic elevator", 3 pp., Retrieved from the Internet on Apr. 18, 2008: http:www.dartfordarchive.org/uk/technology/magnified/cyclic_elev.htm.

* cited by examiner

DEVICE FOR STORING OBJECTS

CROSS-REFERENCE TO RELATED APPLICATION

The present application claims the benefit of priority of International Patent Application No. PCT/EP2007/000305 filed on Jan. 16, 2007, which application claims priority of German Patent Application No. 10 2006 008 123.4 filed Feb. 20, 2006. The entire text of the priority application is incorporated herein by reference in its entirety.

FIELD OF THE DISCLOSURE

The present disclosure relates to a device for storage of objects, such as an accumulator device used to provide a buffer with conveyor systems.

BACKGROUND OF THE DISCLOSURE

Such devices are known in various embodiments, where the two conveyor tracks each have their own conveyance means (EP 581 143 B1, EP 1 161 391 B1) or a joint conveyance means (EP 581 143 B1, WO 2005/073113 A2) in the form of a continuous conveyor chain or the like. With these known storage devices, the monitoring of the elements required for function such as the conveyance means including their accessories, the transfer mechanism, etc. plus optionally the objects transported in running operation is accomplished purely visually by the operating personnel. Since the elements to be monitored are very difficult to see, in particular in the case of storage devices having a high capacity and large dimensions accordingly, it is difficult to see and track the objects, damage and malfunctions that can lead to serious consequences, damages and production downtime cannot always be detected promptly.

SUMMARY OF THE DISCLOSURE

The object of the present disclosure is to significantly improve upon the possibility of detection of damages and trouble in the case of a storage device of the generic type.

In the case of an inventive storage device, any disturbances and/or damage that occur can be detected directly and without delay at the site so to speak by means of the at least one control unit without requiring the assistance of an operating person. The control unit can perform a wide variety of monitoring functions on the conveyor tracks, on the conveyance means, the transfer line itself, the objects, etc., and may include all conventional sensors, cameras, etc., accordingly.

It is especially advantageous if, according to another refinement of the present disclosure, at least one control unit is set up on the transfer mechanism and can be moved together with it. This control unit is suitable in particular for monitoring the transfer movement of the objects and/or—in the case of storage devices with only one conveyor chain or the like—monitoring the transfer movement of the conveyor chain over the transfer mechanism.

It is also especially advantageous if, according to a refinement of the disclosure, the signal of the control unit is transferred to a stationary control station. This control station is able to automatically intervene in the operation of the storage device and automatically stop it, for example and also inform and alert the operating personnel in a variety of ways. According to various refinements of the present disclosure, the signals may be transferred over stationary lines or by wireless means, optionally with the inclusion of transmission devices that allow relative movements or loop contacts which may at the same time assume the functions of power supply to the moving control units.

BRIEF DESCRIPTION OF THE DRAWINGS

An exemplary embodiment of the present disclosure is described below with reference to the drawings, in which.

DETAILED DESCRIPTION OF THE DISCLOSURE

Figure 1:
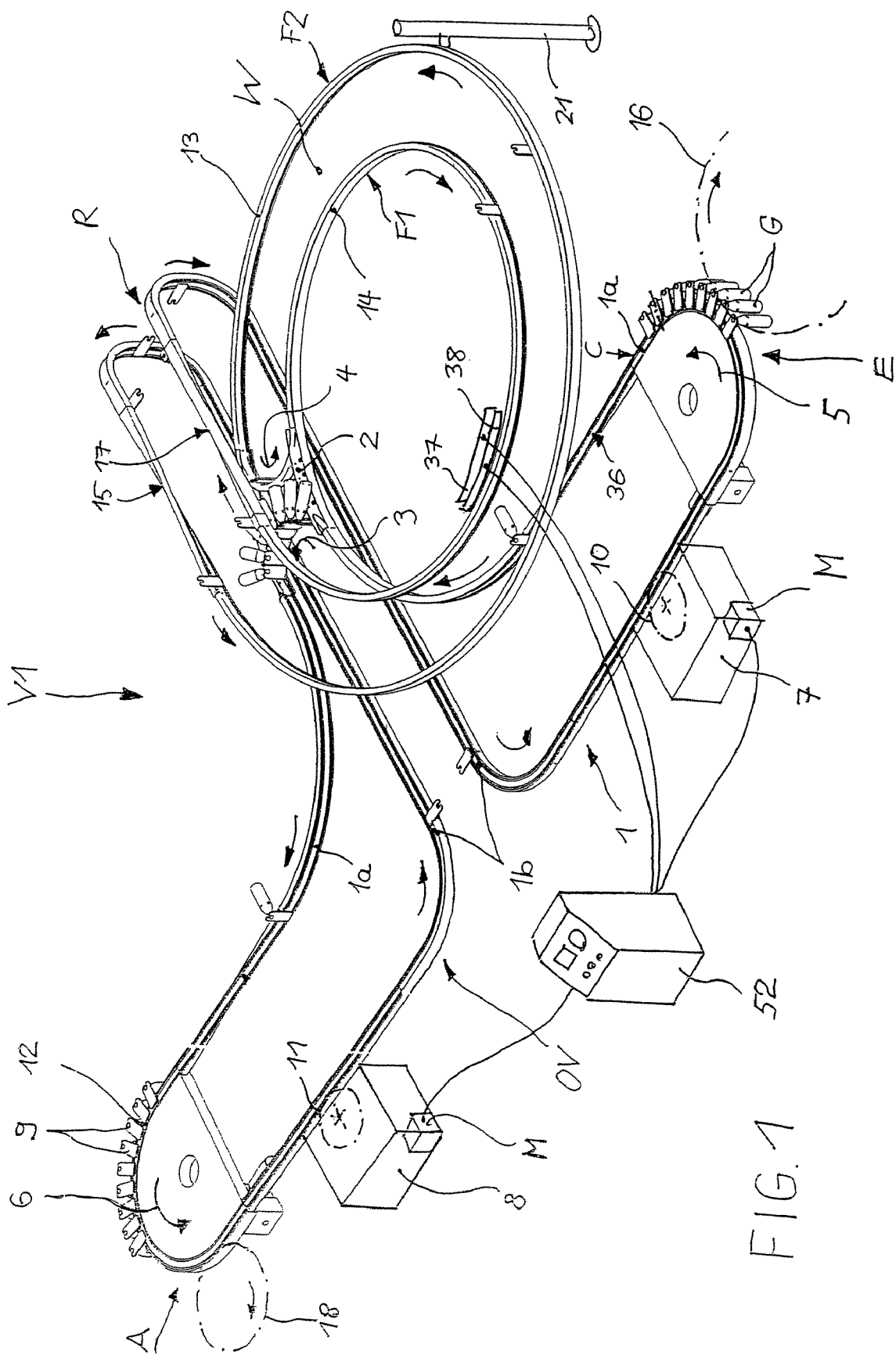
FIG. 1 shows a perspective schematic diagram of a device for storing objects having two conveyor tracks in the form of a spiral

The dynamic storage $V_1$ according to FIGS. 1 through 5 comprises essentially a single continuous conveyor means 1 in the form of a roller chain 12 equipped with grippers 9, stationary guide rails 13, 14 for the roller chain, a transfer mechanism in the form of a carriage 2 that can be moved along the guide rails 13, 14 and having a first 180° deflection 3 and a second 180° deflection 4 for the roller chain, an inlet station E with a third 180° deflection 5 and a first drive mechanism 7 as well as an outlet station A having a fourth 180° deflection 6 and a second drive station 8 for the roller chain 12.

The drive stations 7, 8 each have a motor M and a gearwheel 10, 11 that can be driven by the motor via transmission elements (not shown), engaging in the roller chain 12. In the area of the inlet station E, the objects G in the form of PET bottles are introduced into the elastic grippers 9, e.g., by the discharge star mechanism 16 of a stretch blow molding machine, which is not otherwise shown here. In the area of the outlet station A, the objects G are removed from a filling and sealing machine, which is not shown further here, by the means of the inlet star mechanism 18, for example.

The third and fourth deflections 5, 6 together with the connected parallel aligned strands of the guide rails 13, 14 define a type of elongated oval OV that is interrupted only at the middle. A coil-shaped or spiral-shaped area W and a vertical return R for the empty strand 1b of the roller chain 12 are connected to the interruptions.

Two concentric conveyor tracks F1 and F2 are formed in the coil-shaped area W by means of the guide rails 13, 14 and the conveyor strand 1a and empty strand 1b of the roller chain 12 running on the guide rails, such that the objects G are transferred between the conveyor tracks by the first deflection 3 of the carriage 2 in combination with the roller chain 12.

Accurate lateral guidance of the roller chain 12 in the area of the deflections 3, 4 is of great importance for the function of the dynamic storage $V_1$ because the movement of the carriage 2 is accomplished merely through the tractive power of the roller chain 12. If the conveyor strand 1a is shortened due to a corresponding difference in speed of the drive stations 7 and 8, then the carriage 2 moves in the direction of the inlet station E and the outlet station A. If the empty strand 1b becomes shorter because of a corresponding difference in speed of the drive stations 7, 8, then the carriage 2 travels from the inlet station E and the outlet station A and the contents of the storage increase.

Figure 2:
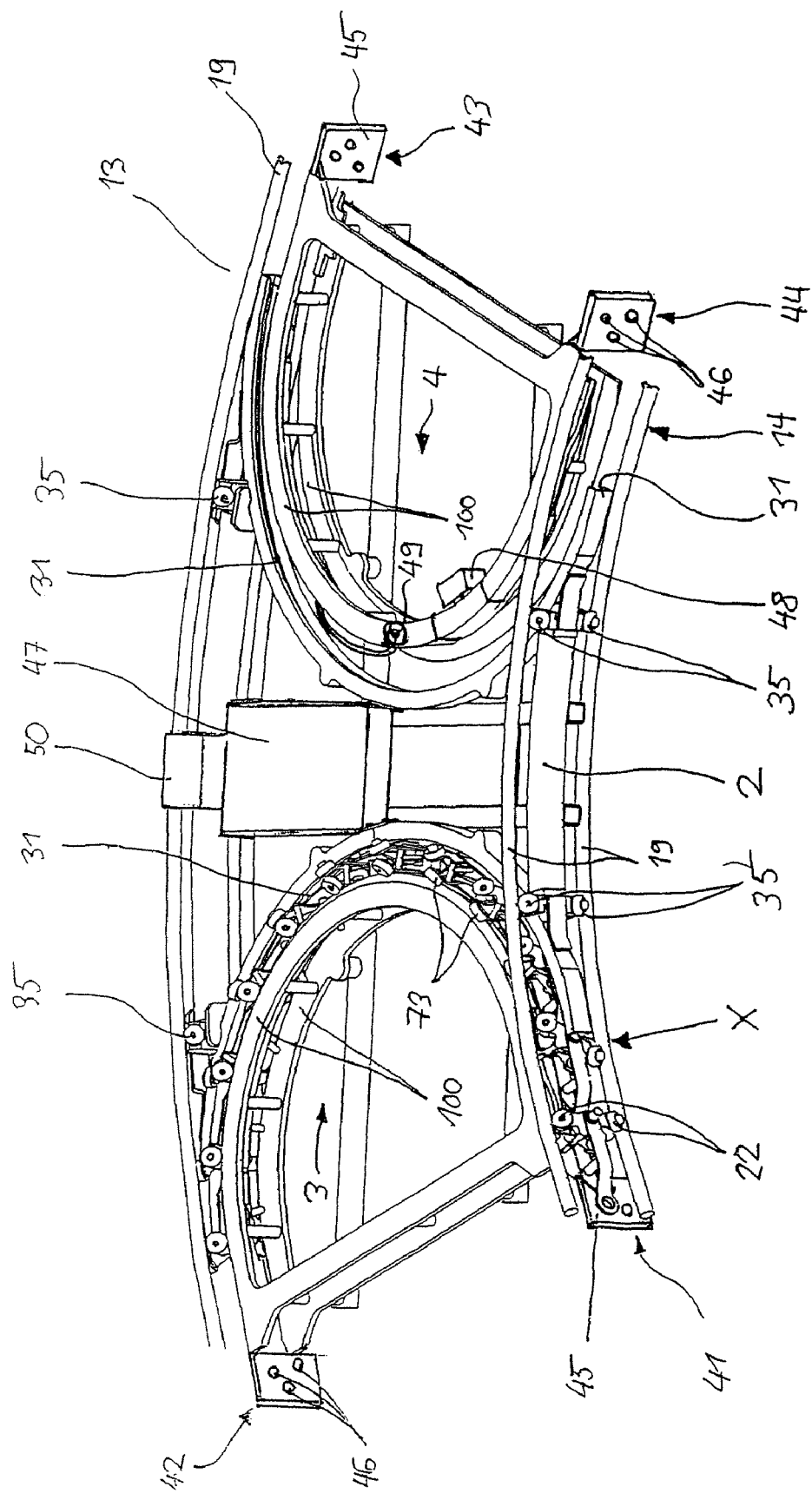
FIG. 2 shows a perspective view of the transfer mechanism of the device according to FIG. 1

The range of movement of the carriage 2 and thus the variable range of the conveyor segment is limited to the spiral or coil-shaped area W of the guide rails 13, 14 and/or the conveyor tracks F1, F2, whereby they run exactly parallel and/or equidistantly in a curve with a slight pitch. The lower end position of the carriage 2 which is thereby defined and is associated with a minimal length of the conveyor segment is depicted in FIG. 2. The upper end position of the carriage 2 which is associated with the maximal length of the conveyor segment is exactly above the former. Connected to the upper end position, there follow two horizontal parallel coiled areas 15, 17 of the guide rails 13, 14 for the empty strand 1b and following that, vertical returns R which guide the roller chain 12 back into the normal plane of conveyance defined by the deflections 5 and 6 and/or upward out of this plane. Two other parallel horizontal areas of the guide rails 13, 14 are connected thereto, leading to the front edge of the oval OV and then opening into the inlet station E and/or the outlet station A after 90° deflections. FIG. 1 shows only partial areas of the roller chain 12 with the grippers 9; in reality, the roller chain 12 runs over the entire area of the guide rails 13, 12 shown here except for the two short segments between the deflections 3 and 4 of the carriage 2, where the rollers 13 of the carriage 2 are located.

For reasons of simplicity, FIG. 1 shows only a single spiral or coil. In practice, this variable storage area will be designed in the form of a multiple coil having a vertical and/or horizontal central axis to achieve a suitably high buffer capacity. The returns R are lengthened then accordingly.

As FIGS. 2 through 5 show, the outer guide rail 13 and the inner guide rail 14 are each made of two parallel round bars 19 with spacers, which are mounted in a stationary frame 21 having a plurality of columns. Each chain link 23 has two pairs of guide rollers 22 that run on the round rods 19, whereby the guide rollers 22 on the outside of the curve are mounted on a double lever 25 which is in turn pivotably mounted on the chain link 23. However, the guide rollers 22 on the inside of the curve are mounted directly on the chain link 23 and therefore are not pivotable. These guide rollers 22 assume the function of guiding the roller chain 12 in the area of the two deflections 3, 4 of the carriage 2. The chain links 23 are joined together by cup bearings 24 so they are movable in space.

Furthermore, a latch 26 is pivotably mounted on each chain link 23 and is prestressed by a rotating spring 27. The pivot axis of the latch 26 is parallel to the pivot axis of the double lever 25. The rotating spring 27 acts clockwise. The latch 26 cooperates with a transverse pin 28 that is mounted on the double lever 25 to protrude on both sides parallel with the axis of rotation. If the transverse pin 28 is engaged with the latch 26, then the double lever 25 is secured against rotation together with the chain link 23 acting as a stop and its two guide rollers 22 are engaged with the round rods 19. This position, in which the double lever 25 is essentially perpendicular to the round rods 19, is interrupted only in the pass through the first deflection 3 and the second deflection 4 in the area of the carriage 2.

To this end, a control cog 29 is provided on the latch 26, cooperating with a ramp 30 on the carriage 2. If the control cog 29 strikes this ramp 30, the latch 26 is pivoted against the force of the rotating spring 27, is thereby disengaged from the transverse pin 28 and thus releases the double lever 25. Its position is now defined in the area of the carriage 2 by a cam 31 with a groove attached to the former, accommodating the transverse pins 28. This cam with a groove is designed so that the double lever 25 is pivoted to a sufficient extent immediately before entering the deflection 3 and/or 4, so that both of its guide rollers 22 can pass through the round rods 19 (position X in FIG. 2). Conversely, immediately after leaving the deflections 3, 4 and after passing between the two round rods 19, the double lever 25 is pivoted back into its normal position in which both of its guide rollers 22 again act on the round rods 19 "from the outside" after which the latch 26 automatically snaps onto the transverse pin 28.

The carriage 2 according to FIG. 2 is movably guided by means of several rollers 35 on the total of four round rods 19 of the outer guide rail 13 and the inner guide rail 14. In addition to the ramp 30 already described above for controlling the latches 26 and the cam 31 with a groove, it has two guide curves 32 which define the first and second deflections 3 and 4 and cooperate with the guide rollers 22 that are immovably mounted on the chain links 23 and thus deflect the roller chain 12 exclusively by means of roller friction. The guide curves 32 act on the facing sides of the guide rollers 22 while the sides of the guide rollers 2 facing away from one another cooperate with the round rods 19. Thus, an overlapping and/or impact-free transition of the guide rollers 22 from the round rods 19 to the guide curves 32 and vice versa is possible.

Each chain link 23 also has a bearing pin 33 protruding on both sides and arranged across the direction of travel. The cup bearing 24 is attached to this bearing pin and the double lever 25 is mounted to pivot there. The projecting ends of the bearing pin 33 engage with the gear wheels 10, 11 of the drive stations 6, 7.

Figure 3:
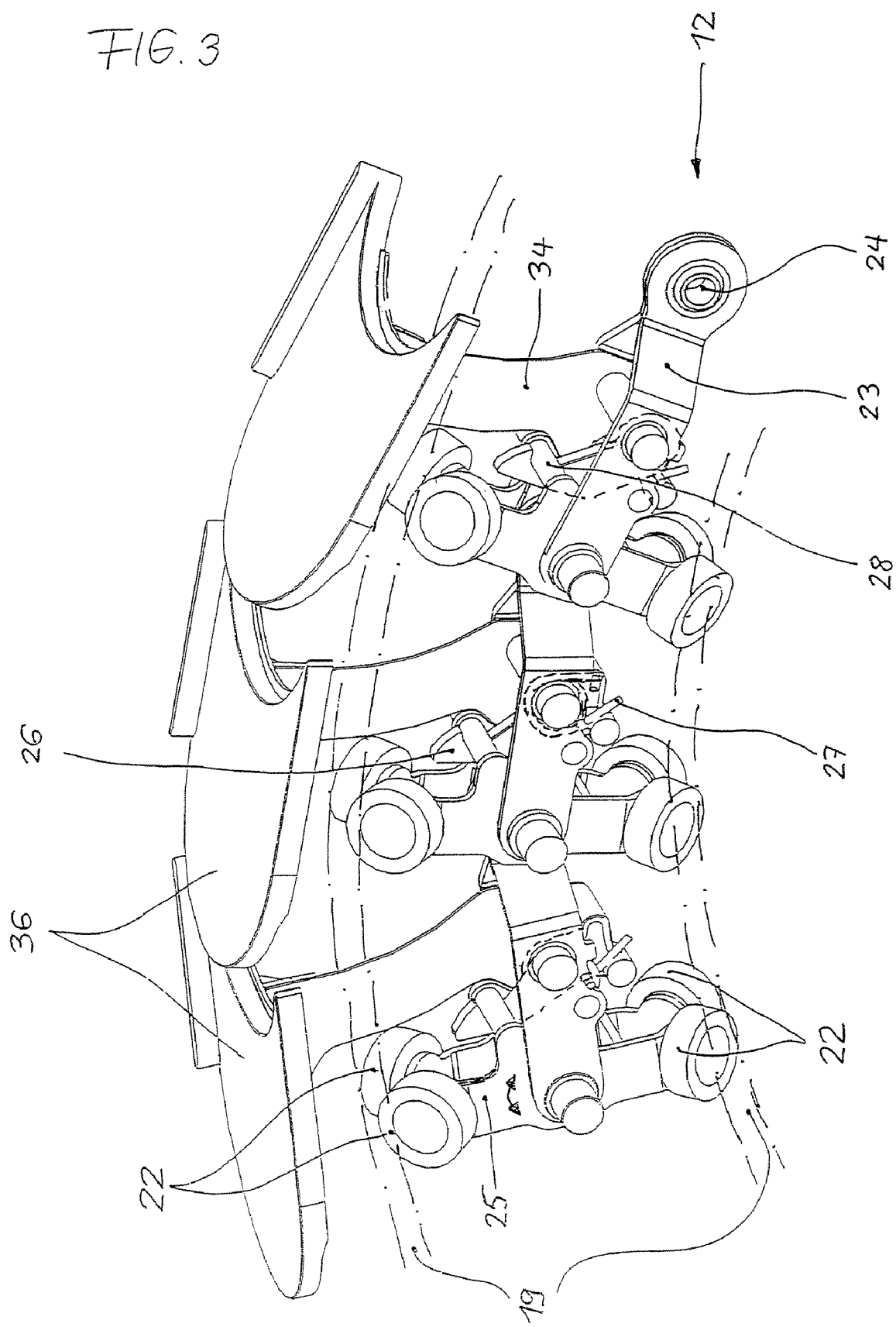
FIG. 3 shows a perspective view of the conveyance means of the device according to FIGS. 1 and 2
Figure 4:
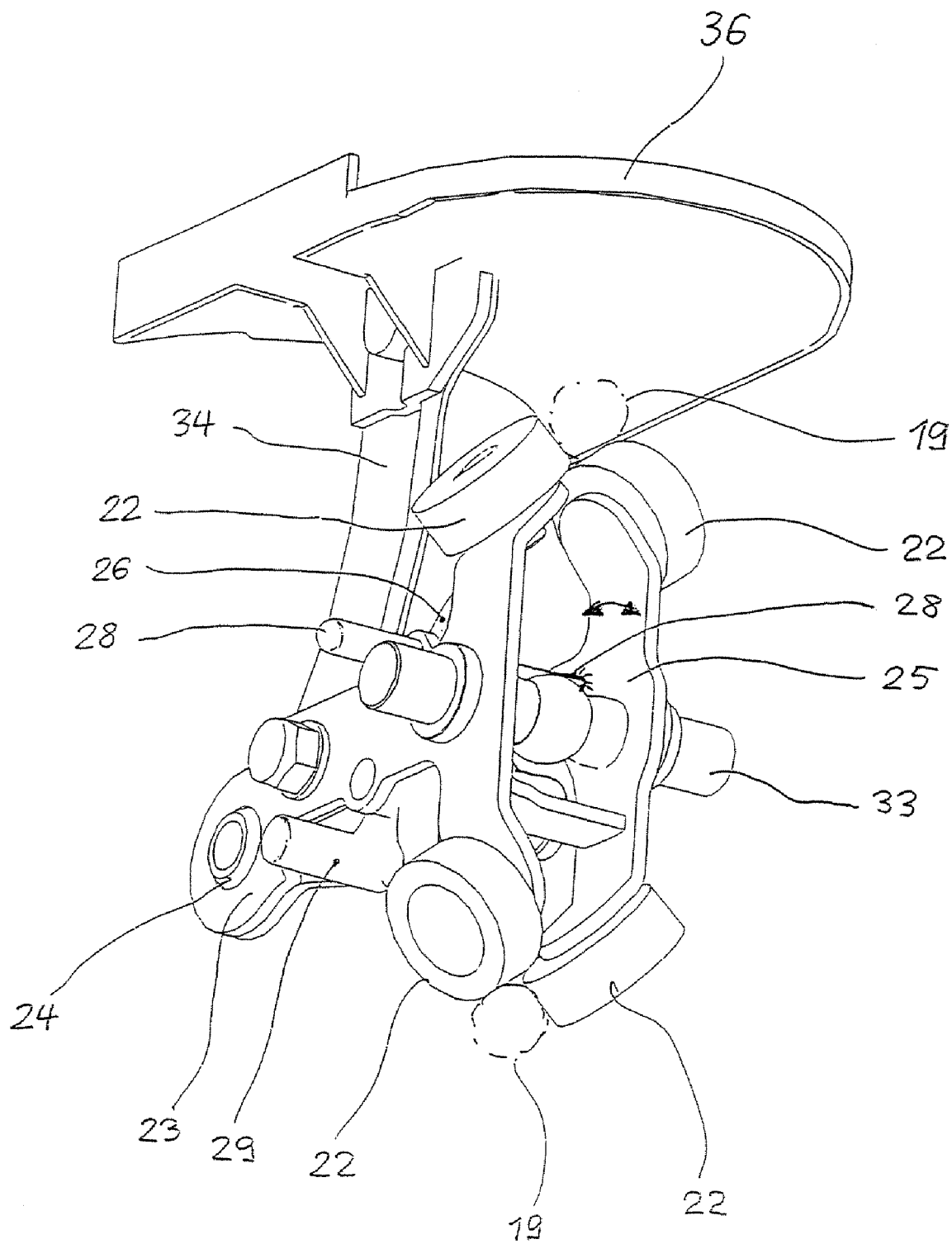
FIG. 4 shows a perspective view of a chain link of the conveyance means according to FIG. 3

The chain links 23 according to FIGS. 3 and 4 are provided with carrying plates 36 on which objects G can be deposited in contrast with the chain links 23 according to FIGS. 1 and 2. It is possible in this way to convey and store even soft cardboard packages.

Figure 5:
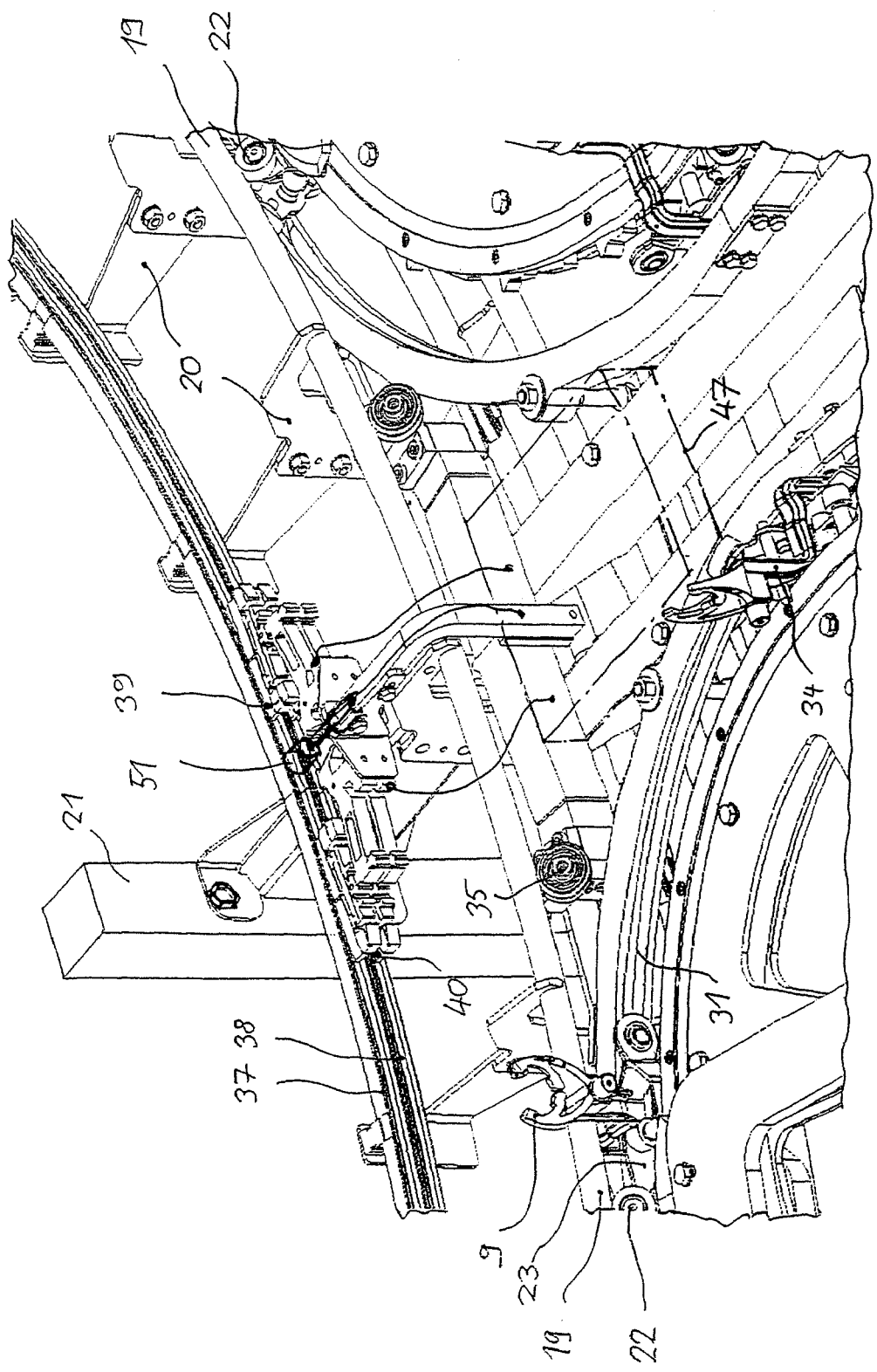
FIG. 5 shows a detail of the transfer mechanism according to FIG. 2.

As shown in FIG. 5, two conductor rails 37, 38 are mounted in a stationary mount on the frame 21 in the area of the coil W concentric with the inner guide rail 14 and/or the inner conveyor track F1. Current collectors 39, 40 cooperate with each conductor rail 37, 38; these current collectors 39, 40 are mounted on the carriage 2, so they are in spring contact with the conductor rails 37, 38 and supply electricity to several control units situated on the carriage 2.

The control units are formed by four sensor groups 41 through 44, each of which is mounted on the carriage 2 in the inlet area and outlet area of the deflection 3 and the deflection 4. Each sensor group 41 through 44 comprises a base plate 45 which is essentially perpendicular to and/or equidistant from the two neighboring round rods 19. In each base plate 45 three sensors 46 that operate by a noncontact method are mounted, e.g., inductive or capacitive sensors. The three sensors 46 of each base plate 45 are arranged in such a way that they simultaneously emit a signal when the bearing pin 33, the transverse pin 28 and the control cog 29 of a fitting chain link 23 assume the relative position shown in FIG. 4. In this relative position the double lever 25 is locked in its essentially vertical position, whereby its two guide rollers 22 act from the outside on the round rods 19. This is the desired position of these elements, which is necessary for proper functioning at the locations where the four sensor groups 41 through 44 are arranged.

If this desired position is not reached, e.g., because a control cog 29 has broken off or the double lever 25 assumes its unlocked, unsecured inclined position, then the signals of the three sensors 46 of a sensor group 41 through 44 are not generated simultaneously but instead with a time lag or the signal is lacking completely. This signal sequence is preferably already processed in an analyzer unit 47 mounted on the carriage 2 and triggers an error signal that is modulated via the current collectors 39, 40 onto the conductor rails 37, 38.

The analyzer unit 47 is connected to the sensors 46 of each control unit 41 through 44 by means of lines (not shown). In the same way, additional control units, e.g., a pressure sensor 48 that receives the tensile stress of the roller chain 12, a position sensor 49 that monitors the transfer and the position of the objects G and cameras 50 for controlling the condition of the guide rails 13, 14 may be connected to the analyzer unit 47. A code reader 51 that cooperates with stationary markings in the area of the conductor rails 37, 38 and defines the exact position of the carriage 2 may also be connected like the illumination devices (not shown), e.g., for objects that facilitate monitoring by an operating person standing at a distance.

For relaying the modulated signals of the analyzer unit 47, the two conductor rails 37, 38 are connected via lines to a stationary control console 52 which is set up at a readily accessible and easily visible location. This control console is equipped with appropriate analysis, display, control and alarm equipment and is also connected by control lines to the motors M of the drive stations 7, 8 and optionally to the upstream and downstream machine.

If the control console 52 receives an "error signal" sent by the analyzer unit 47, various reactions are possible, depending on the significance of the damage or malfunction detected by the control unit, beginning with a reading in a display to an optical and/or acoustic warning signal or even an automatic shutdown of the motors M. This reliably prevents the risk of serious damages and prolonged downtime in production.

The control units described above with regard to their arrangement on the movable carriage 2 may alternately or additionally also be arranged in a stationary position. For example, FIG. 2 shows two sensor groups 53, 54 with dash-dot lines; these sensors monitor the chain links 23 in the same way as the sensor groups 41 through 44 and are connected directly to the control console 52 by way of lines. It is also possible to arrange a control unit directly on a chain link 23. For example, these sensors may monitor the condition of the round rods 19 or store load values. In the case of storage devices in which each conveyor track has its own conveyor means, the disclosed monitoring by functional control units is advantageous.

We claim:

1. Device for storing articles, comprising two conveyor tracks that can be driven in opposite directions, a transfer mechanism that can be moved along these tracks for transferring the articles between the two conveyor tracks, and at least one functional control unit that monitors the device for malfunctions of the device or damage to the articles; wherein the at least one control unit is arranged to move along the conveyor tracks; and wherein the at least one control unit is arranged on the transfer mechanism.

2. Device according to claim 1, wherein the at least one control unit is connected to a stationary control station by a wireless connection.

3. Device according to claim 2, wherein the at least one control unit is connected to the control station by stationary conductor rails and current collectors that receive current from these rails.

4. Device according to claim 2, wherein the wireless connection is a radio signal.

5. Device according to claim 1, wherein the at least one control unit monitors one of the relative position and the presence of certain elements of a chain link.

6. Device according to claim 5, wherein the control unit has a base plate with several sensors attached to it in predetermined positions.

7. Device according to claim 1, wherein the at least one control unit monitors the tensile stress of a flexible conveyor means.

8. Device according to claim 1, wherein the at least one control unit monitors the condition of the guide rails for a roller chain.

9. Device according to claim 1, wherein at least one control unit monitors one of the movement and position of the articles in the area of the transfer mechanism.

10. Device according to claim 1, wherein the at least one control unit monitors the position of the transfer mechanism with regard to the conveyor tracks.

* * * * *